US012774411B2

(12) United States Patent
Conkle

(10) Patent No.: US 12,774,411 B2
(45) Date of Patent: Oct. 27, 2026

(54) MICROMESH PROPPANT AND METHODS OF MAKING AND USING SAME

(71) Applicant: Carbo Ceramics, LLC, Houston, TX (US)

(72) Inventor: Don Conkle, Katy, TX (US)

(73) Assignee: Carbo Ceramics, LLC

( * ) Notice: Subject to any disclaimer, the term of this patent is extended or adjusted under 35 U.S.C. 154(b) by 0 days.

(21) Appl. No.: 19/345,858

(22) Filed: Sep. 30, 2025

(65) Prior Publication Data

US 2026/0022290 A1 Jan. 22, 2026

Related U.S. Application Data

(60) Continuation of application No. 18/117,786, filed on Mar. 6, 2023, now Pat. No. 12,428,591, which is a
(Continued)

(51) Int. Cl.
*C09K 8/80* (2006.01)
*C04B 33/04* (2006.01)
(Continued)

(52) U.S. Cl.
CPC ................ *C09K 8/80* (2013.01); *C04B 33/04* (2013.01); *C04B 35/10* (2013.01); *C04B 35/1115* (2013.01); *C04B 35/62695* (2013.01); *C04B 35/64* (2013.01); *C04B 2103/408* (2013.01); *C04B 2235/3217* (2013.01); *C04B 2235/349* (2013.01); *C04B 2235/5436* (2013.01);
(Continued)

(58) Field of Classification Search
CPC .................................................... E21B 43/267
See application file for complete search history.

(56) References Cited

U.S. PATENT DOCUMENTS

2009/0227480 A1* 9/2009 de Paiva Cortes ...... C09K 8/80 507/271
2014/0038859 A1 2/2014 Skala et al.
(Continued)

OTHER PUBLICATIONS

International Search Report and Written Opinion for International Application PCT/US2018/040759, dated Sep. 13, 2018, 7 pages.

*Primary Examiner* — William D Hutton, Jr.
*Assistant Examiner* — Avi T Skaist
(74) *Attorney, Agent, or Firm* — Enrique Sanchez, Jr.; Miguel Hernandez

(57) ABSTRACT

The present disclosure relates to a micromesh proppant for use in hydraulic fracturing of oil and gas wells. In one embodiment, a process for forming proppant particles includes providing a slurry comprising a ceramic raw material containing alumina, atomizing the slurry into droplets, coating seeds comprising alumina with the droplets to form green pellets, sintering the green pellets to form sintered pellets, and breaking the sintered pellets to form proppant particles comprising a sintered ceramic material and having a size of from about 150 mesh to about 500 mesh and a crush strength at 7,500 psi of from about 1% to about 20%. In one embodiment, a proppant particle includes a sintered ceramic material and having a size of from about 150 mesh to about 500 mesh and a crush strength at 7,500 psi of from about 1% to about 20%.

20 Claims, 2 Drawing Sheets

Related U.S. Application Data division of application No. 16/026,599, filed on Jul. 3, 2018, now Pat. No. 11,597,872.

(60) Provisional application No. 62/528,573, filed on Jul. 5, 2017.

(51) Int. Cl.

| | |
|---|---|
| ***C04B 35/10*** | (2006.01) |
| ***C04B 35/111*** | (2006.01) |
| ***C04B 35/626*** | (2006.01) |
| ***C04B 35/64*** | (2006.01) |
| *C04B 103/40* | (2006.01) |

(52) U.S. Cl.

CPC ...... *C04B 2235/66* (2013.01); *C04B 2235/77* (2013.01); *C04B 2235/96* (2013.01)

(56) References Cited

U.S. PATENT DOCUMENTS

2016/0068744 A1 3/2016 Cannan et al.
2016/0264854 A1* 9/2016 Alary .................... C09K 8/805

* cited by examiner

MICROMESH PROPPANT AND METHODS OF MAKING AND USING SAME

CROSS-REFERENCE TO RELATED APPLICATIONS

This application is a Continuation application of U.S. patent application Ser. No. 18/117,786, filed Mar. 6, 2023, which is a divisional application of U.S. patent application Ser. No. 16/026,599 filed on Jul. 3, 2018, which claims priority to U.S. Provisional Application No. 62/528,573 filed on Jul. 5, 2017, all of which are herein incorporated by reference in their entireties.

TECHNICAL FIELD

The present disclosure relates to a micromesh proppant for use in hydraulic fracturing of oil and gas wells.

BACKGROUND

Hydraulic fracturing is a process of pumping liquids down a well and into a subterranean formation at high rate and pressure, such that a fracture is formed in the rock around the well. After pumping a liquid volume sufficient to widen the fracture adequately, solid particles, called "proppant," are added to the liquid. After pumping is completed, the well is opened for production of hydrocarbons. The production rate of fluid from the well is usually significantly increased after the fracturing treatment.

The material first used for proppant in hydraulic fracturing of wells was silica sand. As wells became deeper, sand was found to have inadequate strength. In deep wells, stress of the earth causes the sand to crush and become much less effective in increasing the production rate of a well.

Synthetic proppant materials were developed to provide higher strength proppants. The original synthetic sintered proppant was sintered bauxite. In later years, a variety of ceramic raw materials have been used to make sintered ceramic proppants, including bauxite containing lesser amounts of alumina and clay minerals, such as kaolin. Generally, it has been found that the strength of ceramic particles increases with the amount of aluminum oxide (alumina) in the particle, all other factors remaining constant.

A general procedure for making synthetic proppant particles is to obtain the ceramic raw material, grind it to a fine powder, form it into pellets (called "green" pellets), which are oftentimes in the size range from about 12 mesh to about 70 mesh. These green pellets are then sintered in a kiln. The final product is ceramic pellets in the standard size range suitable for proppants, from about 70 mesh to 12 mesh (0.008 inch to 0.067 inch in diameter).

100 mesh sand and smaller can be used for abrasion purposes and for forming microfractures. However, this small mesh sand generally breaks easily and crushes at depths experiencing high closure stress. What is needed is an angular proppant having abrasive characteristics of 100 mesh sand and smaller, but with a high mechanical strength so that the proppant will not break easily or crush during the fracturing of oil and gas wells.

SUMMARY

The present disclosure relates to a micromesh proppant for use in hydraulic fracturing of oil and gas wells. In one embodiment, a process for forming proppant particles includes providing a slurry comprising a ceramic material, flowing the slurry through a nozzle to form droplets, introducing the droplets to a vessel containing a liquid comprising a coagulation agent, drying the droplets to form pellets, sintering the pellets to form sintered pellets, and breaking the sintered pellets to form proppant particles comprising a sintered ceramic material and having a size of from about 150 mesh to about 500 mesh and a crush strength at 7,500 psi of from about 1% to about 20%. In one embodiment, a proppant particle includes a sintered ceramic material and having a size of from about 150 mesh to about 500 mesh and a crush strength at 7,500 psi of from about 1% to about 20%. In one embodiment, a method of hydraulic fracturing a subterranean formation includes injecting a hydraulic fluid into a subterranean formation at a rate and pressure sufficient to open a fracture therein. The method includes injecting a fluid containing a proppant particle into the fracture, the proppant particle comprising a sintered ceramic material and having a size of from about 150 mesh to about 500 mesh and a crush strength at 7,500 psi of from about 1% to about 20%.

DETAILED DESCRIPTION

Figure 1:
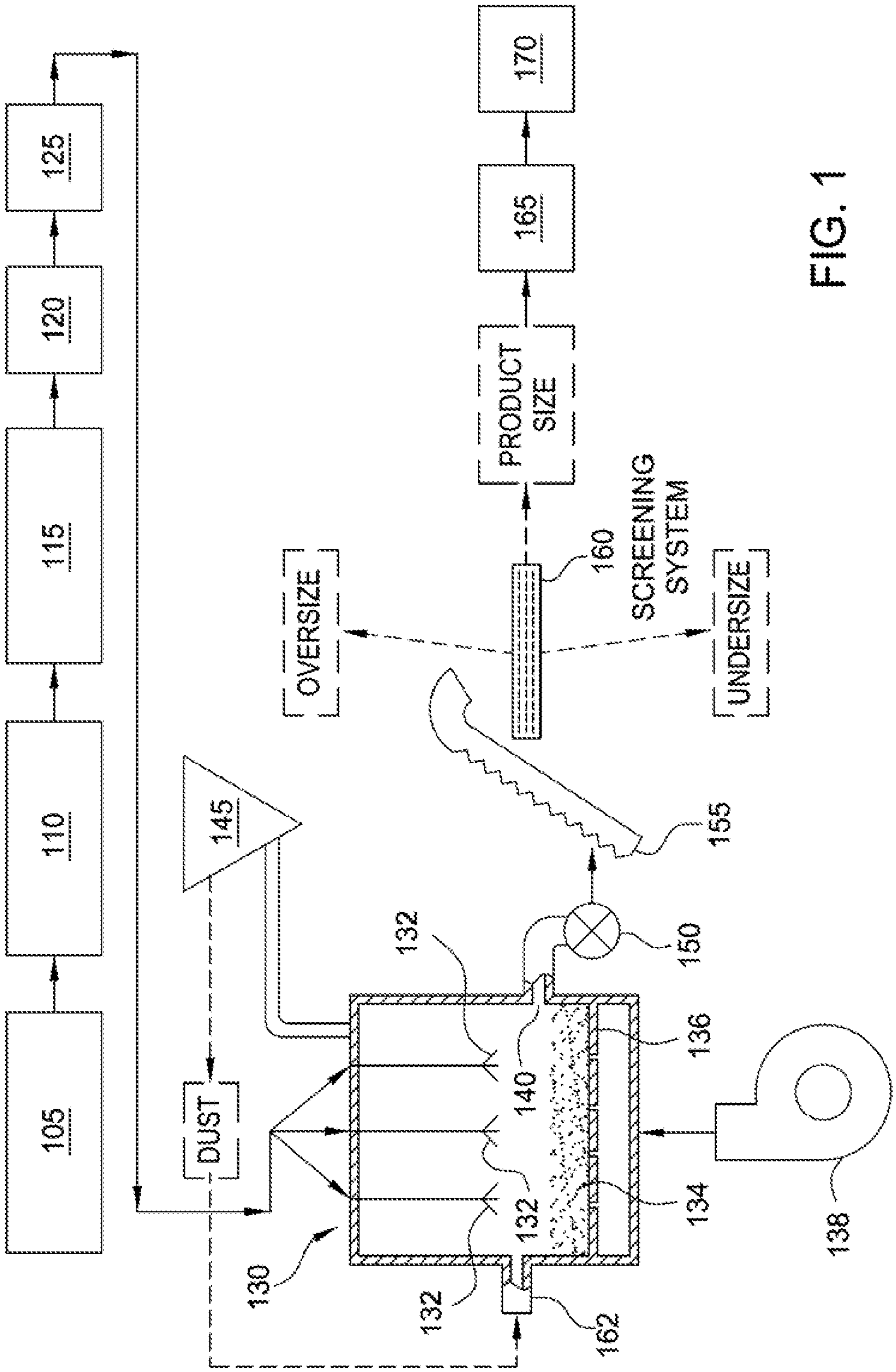
FIG. 1 is a schematic illustrating of a system for preparing proppant particles, according to one embodiment.

The present disclosure relates to a micromesh proppant comprising angular sintered particles of a material selected from kaolin, bauxite, clay-minerals, and mixtures thereof, with particle sizes varying from about 150 mesh to about 700 mesh, such as from about 150 mesh to about 500 mesh, such as from about 175 mesh to about 300 mesh. The micromesh proppant can have a size smaller than about 150 mesh, about 160 mesh, about 180 mesh, or about 200 mesh. In one or more exemplary embodiments, the micromesh proppant can have a size from about 155 mesh, about 160 mesh, about 175 mesh, about 200 mesh, about 225 mesh to about 250 mesh, about 300 mesh, about 350 mesh, about 400 mesh, about 450 mesh, or about 500 mesh. A proppant of the present disclosure having a size of from 150 mesh to 500 mesh can provide low settling velocity and propping of microfractures deep within complex fracture networks.

The present disclosure further relates to a process for the production of a micromesh proppant comprising a material selected from bauxite, clay-minerals, and mixtures thereof, comprising the steps of drying, grinding, pelletizing and sintering a bauxite starting material, grinding the sintered pellets into angular particles, and sizing said particles to a particle size varying from 150 mesh to 400 mesh, or from 175 mesh to 300 mesh.

The disclosure also relates to a hydraulic fracturing process which uses as a proppant the micromesh proppant as described above.

The micromesh proppant can be an angular abrasive proppant made of substantially or entirely angular sintered particles of a material selected from bauxite, clay-minerals, such as kaolins or mixtures thereof, with particle sizes varying from 150 mesh to 400 mesh, or from 175 mesh to 300 mesh. That is, the proppant can have a substantial absence of non-angular particles (e.g., spherical particles) and/or particles lying outside the 150 mesh to 400 mesh size range.

The micromesh proppant, or angular abrasive proppant, disclosed herein can be formed from ceramic particles that are crushed, ground, pulverized, or milled. The micromesh proppant can have an angular surface having a plurality of protrusions including ridges, peaks, and the like. The ceramic particles disclosed herein can be formed from any suitable alumina-containing raw material. The alumina-containing raw material can include but is not limited to bauxite, kaolin or kaolinite, slag, fly ash, civil work sand, fritted rock from naturally burnt coal formations, and burnt rock waste and the like. In one or more exemplary embodiments, the proppant disclosed herein can be obtained from any suitable bauxite material and can vary widely according to the region from which it originates, in addition to clay-minerals, kaolins for example, or mixtures thereof with raw bauxite in any proportions.

In one or more exemplary embodiments, the ceramic particles can be made according to a method as described in U.S. Pat. No. 4,879,181, the entire disclosure of which is incorporated herein by reference. The ceramic raw material feed, or alumina-containing raw material, can be introduced to a calciner and initially calcined in the calciner, by known prior art methods, at temperatures and times sufficiently high to remove any organic material and to substantially remove water of hydration to provide calcined ceramic raw material.

The calcined ceramic raw material can be added in a predetermined ratio to a grinder, such as a ball mill, to provide a dry homogeneous particulate mixture. The dry homogeneous particulate mixture can have an average particle size of less than about 15 microns, less than about 10 microns, less than about 5 microns, or between about 3 microns and 0.5 microns.

The binder can be added at any suitable stage in the methods described above. In one or more exemplary embodiments, the binder can be introduced at any location prior to, on, or after, the calciner and/or the grinder and prior to any pelletizing step. In one or more exemplary embodiments, the binder material can be introduced to the grinder in dry form and subjected to grinding along with the calcined ceramic raw material. In one or more exemplary embodiments, the binder material can be mixed or blended with the calcined ceramic raw material before entering the grinder. In one or more exemplary embodiments, the binder material can be supplied directly to the grinder.

The dry homogeneous particulate mixture provided by the grinder can be introduced to a separator that can screen out or remove binder particles having a size of about 50 microns or greater. These large separated binder particles can be recycled to the grinder for regrinding into smaller particles.

The remaining dry homogeneous particulate mixture having an average particle size of less than about 15 microns can be introduced to a pelletizing mixer to provide pellets having any suitable size.

A suitable mixer can be that obtainable from Eirich Machines, Inc., known as the Eirich Mixer. A mixer of this type can be provided with a horizontal or inclined circular table, which can be made to rotate at a speed of from about 10 to about 60 revolutions per minute (rpm), and can be provided with a rotatable impacting impeller, which can be made to rotate at a tip speed of from about 5 to about 50 meters per second. The direction of rotation of the table can be opposite that of the impeller, causing material added to the mixer to flow over itself in countercurrent manner. The central axis of the impacting impeller can be located within the mixer at a position off center from the central axis of the rotatable table. The table can be in a horizontal or inclined position, wherein the incline, if any, can be between 0 and 35 degrees from the horizontal.

While the mixture is being stirred, a suitable amount of water can be added to cause formation of composite, spherical pellets from the ceramic powder mixture. The total quantity of water sufficient to cause essentially spherical pellets to form can be from about 17 to about 20 wt % of the calcined ceramic raw material. The total mixing time can be from about 2 to about 6 minutes.

After the calcined ceramic raw material is added to the mixer, the table can be rotated at from about 10 to about 60 rpm or from about 20 to about 40 rpm, and the impacting impeller can be rotated to obtain a tip speed of from about 25 to about 50 or from about 25 to about 35, meters per second, and sufficient water can be added to cause essentially spherical pellets of the desired size to form. If desired, the impeller can be initially rotated at from about 5 to about 20 meters per second during addition of one-half of the sufficient water and subsequently rotated at the higher tip speed of 25 to about 50 meters per second during the addition of the balance of the water. The rate of water addition is not critical. The intense mixing action can quickly disperse the water throughout the particles.

The resulting pellets can be dried at a temperature of between about 100° C. (212° F.) and about 300° C. (572° F.) until less than 3 percent or less than 1 percent moisture remains in the pellets. For example, the drying temperature can be between about 175° C. (347° F.) and 275° C. (527° F.), and the drying time can be between about 30 and about 60 minutes.

The dried pellets can then be furnaced at a sintering temperature for a period sufficient to enable recovery of the ceramic particles. The specific time and temperature to be employed can be dependent on the starting ingredients and can be determined empirically according to the results of physical testing of ceramic particles after furnacing. The furnacing step can be carried out to sinter the composite pellets; generally, temperatures of between about 1,250° C. and about 1,550° C. for about 4 to about 20 minutes or from about 1,400° C. to about 1,515° C. for about 4 to about 8 minutes.

Referring now to FIG. 1, an exemplary system for implementing a continuous process for preparing sintered, substantially round and spherical particles from a slurry is illustrated. The exemplary system illustrated in FIG. 1 is similar in configuration and operation to that described in U.S. Pat. No. 4,440,866, the entire disclosure of which is incorporated herein by reference. The operations performed by the exemplary system illustrated in FIG. 1 can also be used to make the particles according to a batch process, as described in Example 1 below.

In the system illustrated in FIG. 1, an alumina-containing raw material having an alumina content of from about 40% to about 55% by weight (on a calcined basis) is passed through a shredder 105 which slices and breaks apart the raw material into small chunks. In some embodiments, when the raw material as mined, or as received, (referred to herein as "untreated" raw material) is of such consistency that it can be processed as described herein without shredding, the shredder may be bypassed. Raw material fed through a shredder such as is illustrated in FIG. 1, is referred to as "treated" raw material.

In certain embodiments, the shredder breaks apart and slices the alumina-containing raw material so as to yield pieces having a diameter of less than about five inches, although pieces having smaller and larger diameters can be further processed into a slurry as described herein. Shredders and numerous other devices for slicing, chopping or comminuting the alumina-containing raw material, as well as commercial sources for same, such as the Gleason Foundry Company, are well-known to those of ordinary skill in the art.

The treated or untreated alumina-containing raw material and water are fed to a blunger 110, which has a rotating blade that imparts a shear force to and further reduces the particle size of the raw material to form a slurry. In a continuous process, the raw material and water are continuously fed to the blunger. Blungers and similar devices for making slurries of such materials, as well as commercial sources for same are well-known to those of ordinary skill in the art.

A sufficient amount of water is added to the blunger 110 to result in a slurry having a solids content in the range of from about 40% to about 60% by weight. In certain embodiments, a sufficient amount of water is added to the slurry such that the solids content of the slurry is from about 45% to about 55% by weight. In still other embodiments, a sufficient amount of water is added to the slurry such that the solids content of the slurry is about 50% by weight. The water added to the blunger 110 can be fresh water or deionized water. In a continuous process for preparing the slurry, the solids content of the slurry is periodically analyzed and the amount of water fed to the slurry adjusted to maintain the desired solids content. Methods for analyzing the solids content of a slurry and adjusting a feed of water are well-known and understood by those of ordinary skill in the art.

In certain embodiments, a dispersant is added to the slurry in the blunger 110 to adjust the viscosity of the slurry to a target range as discussed further below. In other embodiments, the viscosity of the slurry in the blunger 110 is adjusted to the target range by the addition of a dispersant and a pH-adjusting reagent.

A dispersant may be added to the slurry prior to the addition of other additives. In certain embodiments, the composition includes a dispersant in an amount of from about 0.15% to about 0.30% by weight based on the dry weight of the alumina-containing raw material.

Exemplary materials suitable for use as a dispersant in the compositions and methods described herein include but are not limited to sodium polyacrylate, ammonium polyacrylate, ammonium polymethacrylate, tetra sodium pyrophosphate, tetra potassium pyrophosphate, polyphosphate, ammonium polyphosphate, ammonium citrate, ferric ammonium citrate, and polyelectrolytes such as a composition of ammonium polymethacrylate and water commercially available from a variety of sources, such as, Kemira Chemicals under the trade name C-211, Phoenix Chemicals, Bulk Chemical Systems under the trade name BCS 4020 and R.T. Vanderbilt Company, Inc. under the trade name DARVAN C. Generally, the dispersant can be any material that will adjust the viscosity of the slurry to a target viscosity such that the slurry can be subsequently processed through one or more pressure nozzles of a fluidizer. In certain embodiments, the target viscosity is less than 150 centipoises (cps) (as determined on a Brookfield Viscometer with a #61 spindle). In other embodiments, the target viscosity is less than 100 cps.

According to embodiments in which a pH-adjusting reagent is used, a sufficient amount of a pH-adjusting reagent is added to the slurry to adjust the pH of the slurry to a range of from about 8 to about 11. In certain embodiments, a sufficient amount of the pH-adjusting reagent is added to the slurry to adjust the pH to about 9, about 9.5, about 10 or about 10.5. The pH of the slurry can be periodically analyzed by a pH meter, and the amount of pH-adjusting reagent fed to the slurry adjusted to maintain a desired pH. Methods for analyzing the pH of a slurry and adjusting the feed of the pH-adjusting reagent are within the ability of those of ordinary skill in the art. Exemplary materials suitable for use as a pH-adjusting reagent in the compositions and methods described herein include but are not limited to ammonia and sodium carbonate.

Generally, the target viscosity of the compositions is a viscosity that can be processed through a given type and size of pressure nozzle in a fluidizer, without becoming clogged. Generally, the lower the viscosity of the slurry, the more easily it can be processed through a given fluidizer. However, the addition of too much dispersant can cause the viscosity of the slurry to increase to a point that it cannot be satisfactorily processed through a given fluidizer. One of ordinary skill in the art can determine the target viscosity for given fluidizer types through routine experimentation.

The blunger 110 mixes the alumina-containing raw material, water, dispersant and pH-adjusting reagent until a slurry is formed. The length of time required to form a slurry is dependent on factors such as the size of the blunger, the speed at which the blunger is operating, and the amount of material in the blunger.

From the blunger 110, the slurry is fed to a tank 115, where the slurry is continuously stirred, and a binder can be added in an amount of from about 0.2% to about 5.0% by weight, based on the total dry weight of the alumina-containing raw material. In certain embodiments, the binder can be added in an amount of from about 0.2% to about 3.0%, from about 0.5% to about 2.5%, or from about 1% to about 2% by weight based on the total dry weight of the alumina-containing raw material.

The tank 115 maintains the slurry created by the blunger 110. However, the tank 115 stirs the slurry with less agitation than the blunger, so as to mix the binder with the slurry without causing excessive foaming of the slurry or increasing the viscosity of the slurry to an extent that would prevent the slurry from being fed through the pressurized nozzles of a fluidizer.

In another embodiment, the binder can be added to the slurry while in the blunger. In this embodiment, the blunger optionally has variable speeds, including a high speed to achieve the high intensity mixing for breaking down the raw material into a slurry form, and a low speed to mix the binder with the slurry without causing the above-mentioned excessive foaming or increase in viscosity.

Referring again to the tank 115 illustrated in FIG. 1, the slurry is stirred in the tank, after addition of the binder, for a time sufficient to thoroughly mix the binder with the slurry. In certain embodiments, the slurry is stirred in the tank for up to about 30 minutes following the addition of binder. In other embodiments, the slurry is stirred in the tank 115 for at least about 30 minutes. In still other embodiments, the slurry is stirred in the tank for more than about 30 minutes after addition of the binder.

Tank 115 can also be a tank system comprised of one, two, three or more tanks. Any configuration or number of tanks that enables the thorough mixing of the binder with the slurry is sufficient. In a continuous process, water, and one or more of dust, oversize particles, or undersize particles from a subsequent fluidizer or other apparatus can be added to the slurry in the tank 115.

From the tank 115, the slurry is fed to a heat exchanger 120, which heats the slurry to a temperature of from about 25° C. to about 90° C. From the heat exchanger 120, the slurry is fed to a pump system 125, which feeds the slurry, under pressure, to a fluidizer 130.

A grinding mill(s) and/or a screening system(s) (not illustrated) can be inserted at one or more places in the system illustrated in FIG. 1 prior to feeding the slurry to the fluidizer to assist in breaking any larger-sized alumina-containing raw material down to a target size suitable for feeding to the fluidizer. In certain embodiments, the target size is less than 230 mesh. In other embodiments, the target size is less than 325 mesh, less than 270 mesh, less than 200 mesh or less than 170 mesh. The target size is influenced by the ability of the type and/or size of the pressure nozzle in the subsequent fluidizer to atomize the slurry without becoming clogged.

If a grinding system is employed, it is charged with a grinding media suitable to assist in breaking the raw material down to a target size suitable for subsequent feeding through one or more pressure nozzles of a fluidizer. If a screening system is employed, the screening system is designed to remove particles larger than the target size from the slurry. For example, the screening system can include one or more screens, which are selected and positioned so as to screen the slurry to particles that are smaller than the target size.

In one or more exemplary embodiments, the binder can be introduced at any location prior to, on, or after, the calciner and/or the grinder and prior to any pelletizing step. In one or more exemplary embodiments, the binder material can be introduced to the grinder in dry form and subjected to grinding along with the calcined ceramic raw material. In one or more exemplary embodiments, the binder material can be mixed or blended with the calcined ceramic raw material before entering the grinder. In one or more exemplary embodiments, the binder material can be supplied directly to the grinder.

The mixture provided by the grinder can be introduced to the screening system that can screen out or remove binder particles having a size of about 50 microns or greater. These large separated binder particles can be recycled to the grinder for regrinding into smaller particles.

Referring again to FIG. 1, fluidizer 130 is of conventional design, such as described in, for example, U.S. Pat. No. 3,533,829 and U.K. Patent No. 1,401,303. Fluidizer 130 includes at least one atomizing nozzle 132 (three atomizing nozzles 132 being shown in FIG. 1), which is a pressure nozzle of conventional design. In other embodiments, one or more two-fluid nozzles are suitable. The design of such nozzles is well-known, for example from K. Masters: “Spray Drying Handbook”, John Wiley and Sons, New York (1979).

Fluidizer 130 further includes a particle bed 134, which is supported by a plate 136, such as a perforated, straight or directional plate. Hot air flows through the plate 136. The particle bed 134 comprises seeds from which green pellets of a target size can be grown. The term “green pellets” and related forms, as used herein, refers to substantially round and spherical particles which have been formed from the slurry but are not sintered. When a perforated or straight plate is used, the seeds also serve to obtain plug flow in the fluidizer. Plug flow is a term known to those of ordinary skill in the art, and can generally be described as a flow pattern where very little back mixing occurs. The seed particles are smaller than the target size for green pellets made according to the present methods. In certain embodiments, the seed comprises from about 5% to about 20% of the total volume of a green pellet formed therefrom. Slurry is sprayed, under pressure, through the atomizing nozzles 132, and the slurry spray coats the seeds to form green pellets that are substantially round and spherical.

External seeds can be placed on the perforated plate 136 before atomization of the slurry by the fluidizer begins. If external seeds are used, the seeds can be prepared in a slurry process similar to that illustrated in FIG. 1, where the seeds are simply taken from the fluidizer at a target seed size. External seeds can also be prepared in a high intensity mixing process such as that described in U.S. Pat. No. 4,879,181, the entire disclosure of which is hereby incorporated by reference.

According to certain embodiments, external seeds are made from either a raw material having at least the same alumina content as the raw material used to make the slurry, or from a raw material having more or less alumina than the raw material used to make the slurry. In certain embodiments, the slurry has an alumina content that is at least 10%, at least 20%, or at least 30% less than that of the seeds. In other embodiments, the external seeds have an alumina content less than that of the slurry, such as at least 10%, at least 20%, or at least 30% less than that of the slurry.

Alternatively, seeds for the particle bed are formed by the atomization of the slurry, thereby providing a method by which the slurry “self-germinates” with its own seed. According to one such embodiment, the slurry is fed through the fluidizer 130 in the absence of a seeded particle bed 134. The slurry droplets exiting the nozzles 132 solidify, but are small enough initially that they get carried out of the fluidizer 130 by air flow and caught as “dust” (fine particles) by a dust collector 145, which may, for instance, be an electrostatic precipitator, a cyclone, a bag filter, a wet scrubber or a combination thereof. The dust from the dust collector is then fed to the particle bed 134 through dust inlet 162, where it is sprayed with slurry exiting the nozzles 132. The dust may be recycled a sufficient number of times, until it has grown to a point where it is too large to be carried out by the air flow and can serve as seed. The dust can also be recycled to another operation in the process, for example, the tank 115.

Referring again to FIG. 1, hot air is introduced to the fluidizer 130 by means of a fan and an air heater, which are schematically represented at 138. The velocity of the hot air passing through the particle bed 134 is from about 0.9 meters/second to about 1.5 meters/second, and the depth of the particle bed 134 is from about 2 centimeters to about 60 centimeters. The temperature of the hot air when introduced to the fluidizer 130 is from about 250° C. to about 650° C. The temperature of the hot air as it exits from the fluidizer 130 is less than about 250° C., and in some embodiments is less than about 100° C.

The distance between the atomizing nozzles 132 and the plate 136 is optimized to avoid the formation of dust which occurs when the nozzles 132 are too far away from the plate 126 and the formation of irregular, coarse particles which occurs when the nozzles 132 are too close to the plate 136. The position of the nozzles 132 with respect to the plate 136 is adjusted on the basis of an analysis of powder sampled from the fluidizer 130.

The green pellets formed by the fluidizer accumulate in the particle bed 134. In a continuous process, the green pellets formed by the fluidizer 130 are withdrawn through an outlet 140 in response to the level of product in the particle bed 134 in the fluidizer 130, so as to maintain a given depth in the particle bed. A rotary valve 150 conducts green pellets withdrawn from the fluidizer 130 to an elevator 155, which feeds the green pellets to a screening system 160, where the green pellets are separated into one or more fractions, for example, an oversize fraction, a product fraction, and an undersize fraction.

The oversize fraction exiting the screening unit 160 includes those green pellets that are larger than the desired product size. In a continuous process, the oversize green pellets may be recycled to tank 115, where at least some of the oversize green pellets can be broken down and blended with slurry in the tank. Alternatively, oversize green pellets can be broken down and recycled to the particle bed 134 in the fluidizer 130. The undersize fraction exiting the screening system 160 includes those green pellets that are smaller than the desired product size. In a continuous process, these green pellets may be recycled to the fluidizer 130, where they can be fed through an inlet 162 as seeds or as a secondary feed to the fluidizer 130.

The product fraction exiting the screening system 160 includes those green pellets having the desired product size. These green pellets are sent to a pre-sintering device 165, for example, a calciner, where the green pellets are dried or calcined prior to sintering. In certain embodiments, the green pellets are dried to a moisture content of less than about 18% by weight, or less than about 15% by weight, about 12% by weight, about 10% by weight, about 5% by weight, or about 1% by weight.

After drying and/or calcining, the green pellets are fed to a sintering device 170, in which the green pellets are sintered for a period of time sufficient to enable recovery of sintered, substantially round and spherical particles having one or more of a desired apparent specific gravity, bulk density, and crush strength. Alternatively, the pre-sintering device 165 can eliminated if the sintering device 170 can provide sufficient calcining and/or drying conditions (i.e., drying times and temperatures that dry the green pellets to a target moisture content prior to sintering), followed by sufficient sintering conditions.

The specific time and temperature to be employed for sintering is dependent on the starting ingredients and the desired density for the sintered particles. In some embodiments, sintering device 170 is a rotary kiln, operating at a temperature of from about 1000° C. to about 1600° C., for a period of time from about 5 to about 90 minutes. In certain embodiments, a rotary kiln is operated at a temperature of about 1000° C., about 1200° C., about 1300° C., about 1400° C. or about 1500° C. In certain embodiments, the green pellets have a residence time in the sintering device of from about 50 minutes to about 70 minutes, or from about 30 minutes to about 45 minutes. After the particles exit the sintering device 170, they can be further screened for size, and tested for quality control purposes. Inert atmosphere sintering can be used. Techniques for replacing the oxygen rich atmosphere in the sintering device with an inert gas such as argon, nitrogen, or helium are well-known to those of ordinary skill in the art. For example, oxygen can be replaced with an inert gas such that 0.005% oxygen or less remains in the sintering atmosphere.

Figure 2:
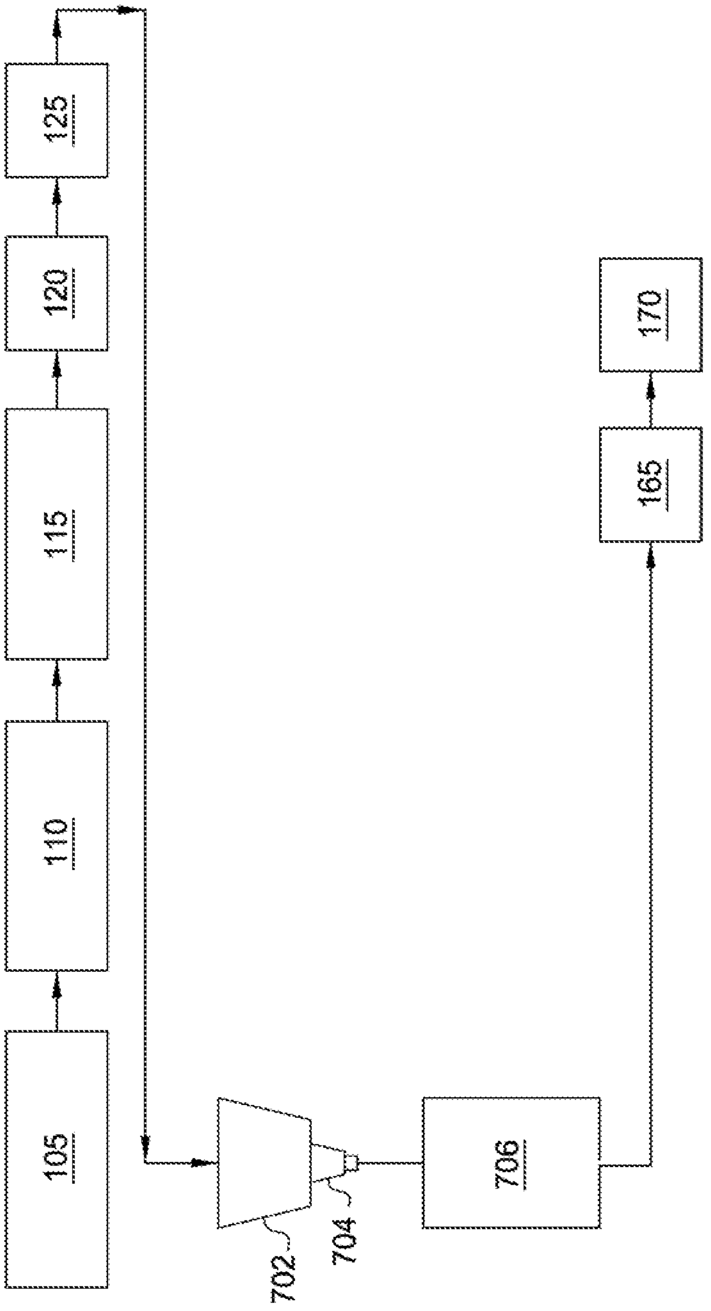
FIG. 2 is a schematic illustrating of a system for preparing proppant particles, according to one embodiment.

FIG. 2 is a schematic illustration of a drip cast system for preparing ceramic particles from a slurry as described herein. As shown in FIG. 2, a ceramic raw material is passed through the shredder 105 and fed to the blunger 110 where the ceramic raw material, water, dispersant, and/or pH-adjusting reagent can be mixed until a slurry is formed. From the blunger 110, the slurry is fed to the tank 115, where the slurry is continuously stirred and the binder is added. From the tank 115, the slurry is fed to the heat exchanger 120, which heats the slurry to a desired temperature. From the heat exchanger 120, the slurry is fed to the pump system 125, which feeds the slurry to a feed tank 702. A nozzle 704 receives a slurry from the feed tank 704, which contains the ceramic raw materials suspended in water or any other suitable aqueous solution. Pressure applied to feed tank 702 by a pressure supply system (not shown) causes the slurry to flow through nozzle 704 at a selected rate to form droplets. Below nozzle 704 is a coagulation vessel 706, which receives the droplets. A vibrator unit (not shown) is connected to the nozzle 704 and is used to supply pressure pulses to the nozzle or directly in the slurry flowing to the nozzle 704. The resulting vibration of the slurry flow through the nozzle 704 causes the stream exiting the nozzle 704 to break into droplets of uniform size as the droplets fall from the nozzle 704 and into an atmosphere surrounding the nozzle 704. The surrounding atmosphere can include any suitable gaseous medium, such as air or nitrogen. As droplets fall toward coagulation vessel 706, surface tension effects tend to form the droplets into spheres. These falling droplets, or spheres, then contact an upper liquid surface of a coagulation liquid contained in the coagulation vessel 706. The droplets solidify and form into green pellets in the coagulation liquid. The green pellets formed in the coagulation vessel are thus formed without the necessity of a sol-gel reaction, reaction gas free fall zone, foamed layer of reaction liquid or reaction liquid directed onto the droplets prior to entering the reaction liquid bath.

The slurry in the feed tank 702 can have any suitable solids content. The solids content of the slurry can range from about 15%, about 20%, about 25%, or about 35% to about 55%, about 65%, about 75%, or about 85%. In one or more exemplary embodiments, the solids content can be from about 25% to about 75%. The viscosity of the slurry can be from about 1, about 10, about 25, about 50, about 100, or about 250 to about 500, about 750, about 1,000, about 2,500 centipoise (cP) or more. Adjusting the viscosity of the slurry can aid in improving droplet formation and formation of spherical particles. The viscosity of the slurry can be optimized or adjusted via selection of reactant type and/or reactant concentration. Optimization of the dispersant type and concentration can also reduce the viscosity of the slurry. Dispersants can be selected based on cost, availability and effectiveness in reducing the viscosity of a selected slurry. Dispersants that can be used to reduce the viscosity of slurry include sodium silicate, ammonium polyacrylate, sodium polymethacrylate, sodium citrate, sodium polysulfonate and hexametaphosphate.

The slurry in the feed tank 702 can also contain any suitable reactant that will react with a component in coagulation liquid in coagulation vessel 706 to form a semi-solid or insoluble compound. This reactant can be or include a monosaccharide, a disaccharide, a polysaccharide, citric acid, methylcellulose, polyvinyl alcohol, polyvinyl acetate, or borate fluids or any combination or mixture thereof. In one or more exemplary embodiments, the reactant is a polysaccharide, such as sodium alginate. Sodium alginate is a naturally occurring polysaccharide that is soluble in water as the sodium salt but is cross-linked to form a gel as the calcium salt.

In one or more exemplary embodiments, the reactant can be or include any suitable polymer or co-polymer with a divalent exchange mechanism. The reactant can be or include poly(ethylene oxide), ethylene-vinyl acetate copolymers, carboxylic acid polymers and copolymers, acrylate polymers and copolymers, and methacrylate polymers and copolymers. In one or more exemplary embodiments, the reactant can be or include any suitable divalent polymer or co-polymer. In one or more exemplary embodiments, the reactant can be or include poly(maleic acid) (PMA), poly (acrylic acid) (PAA), or any combination thereof. For example, the reactant can be or include a PMA:PAA copolymer. In one or more exemplary embodiments, the reactant can include at least a portion of any of the binder materials disclosed herein.

The slurry can include the reactant in any suitable amounts. The slurry can have a reactant concentration of about 0.01 wt %, about 0.05 wt %, about 0.1 wt %, about 0.25 wt %, about 0.5 wt %, about 0.8 wt %, about 1.2 wt %, or about 1.5 wt % to about 1.8 wt %, about 2 wt %, about 2.5 wt %, about 3 wt %, about 4 wt %, about 5 wt %, about 6 wt %, or about 8 wt %. In one or more exemplary embodiments, the slurry reactant concentration can be from about 0.2 wt % to about 4 wt %, about 0.4 wt % to about 2.8 wt %, about 0.6 wt % to about 2.4 wt %, about 0.8 wt % to about 1.8 wt %, or about 1.2 wt % to about 1.6 wt %.

The reactant can be added at any suitable stage in the system illustrated in FIG. 2. In one or more exemplary embodiments, the reactant can be introduced to the system illustrated in FIG. 2, at any location prior to, on, or after, the shredder 105, the blunger 110, the tank 115, the heat exchanger 120, the pump system 125, and the feed tank 702 to provide the ceramic particle. In one or more exemplary embodiments, the reactant can be introduced to the system illustrated in FIG. 2, at any location prior to the coagulation vessel 706 to provide the ceramic particle.

A grinding mill(s) and/or a screening system(s) (not illustrated) can be inserted at one or more places in the system illustrated in FIG. 2 prior to feeding the slurry to the a feed tank 702 to assist in breaking any larger-sized alumina-containing raw material down to a target size suitable for feeding to the a feed tank 702. In certain embodiments, the target size is less than 230 mesh. In other embodiments, the target size is less than 325 mesh, less than 270 mesh, less than 200 mesh or less than 170 mesh. The target size is influenced by the ability of the type and/or size of the nozzle 704 without becoming clogged.

If a grinding system is employed, it is charged with a grinding media suitable to assist in breaking the raw material down to a target size suitable for subsequent feeding through one or more pressure nozzles of a fluidizer. If a screening system is employed, the screening system is designed to remove particles larger than the target size from the slurry. For example, the screening system can include one or more screens, which are selected and positioned so as to screen the slurry to particles that are smaller than the target size.

In one or more exemplary embodiments, the binder can be introduced to the grinder to provide at least a portion of the reactant in the slurry. In one or more exemplary embodiments, the binder material can be introduced to the grinder in dry form and subjected to grinding along with the calcined ceramic raw material. In one or more exemplary embodiments, the binder material can be mixed or blended with the calcined ceramic raw material before entering the grinder. In one or more exemplary embodiments, the binder material can be supplied directly to the grinder.

The mixture provided by the grinder can be introduced to the screening system that can screen out or remove binder particles having a size of about 50 microns or greater. These large separated binder particles can be recycled to the grinder for regrinding into smaller particles.

Coagulation tank 706 can contain a coagulation liquid which gels the reactant chemical in the slurry. In other words, the coagulation liquid can include any suitable coagulation agent which gels the reactant. The coagulation agent can also be or include any cationic material suitable for ion exchange with the reactant. The coagulation agent can be or include a divalent, trivalent or higher cationic material. In one or more exemplary embodiments, the coagulation agent can be or include one or more salts of calcium, magnesium, strontium, aluminum, and/or iron. For example, the coagulation agent can be or include one or more of calcium chloride, magnesium chloride, or the like. The coagulation liquid can be or include an aqueous solution containing the coagulation agent. The coagulation liquid can have a coagulation agent concentration of about 0.01 wt %, about 0.05 wt %, about 0.1 wt %, about 0.5 wt %, about 1 wt %, about 2 wt %, or about 4 wt % to about 6 wt %, about 8 wt %, about 10 wt %, about 15 wt %, or about 20 wt % or more. In one or more exemplary embodiments, a coagulation liquid for sodium alginate is a calcium chloride solution at concentration levels of 0.5% to 10% by weight.

In one or more exemplary embodiments, the coagulation liquid in the coagulation tank 706 can contain a coagulation agent and/or a reducing agent. In one or more exemplary embodiments, the slurry disclosed herein can also contain a reducing agent.

The diameter of nozzle 704, the viscosity of slurry, the ceramic particle content of slurry, pressure to feed the slurry to the nozzle, along with the frequency and amplitude of vibration applied by vibrator source are adjusted to produce droplets having a desired size. These variables are preferably set at a constant value as spheres are produced to be formed into a batch of pellets of propping material. Different batches may be produced having different size pellets. Preferably, each batch will be monosized (i.e., contained on a single sieve such as passing through a 20 mesh sieve but staying on a 25 mesh sieve). The pressure used to feed slurry to the nozzle is adjusted to create laminar flow through the nozzle. The feed pressure can range from 1 to 50 psi. The frequency is adjusted for each set of slurry conditions such that a resonance is established in the slurry stream exiting the nozzle that then produces spherical droplets. The frequency can range from 10 to 20,000 Hz. The pressure and frequency are optimized iteratively to create uniform spherical shapes. The amplitude is adjusted to improve the uniform shape of the spherical droplets formed. The flow rate of the slurry through a nozzle is a function of the nozzle diameter, slurry feed pressure, and the slurry properties such as viscosity and density. For example, for kaolin and alumina slurries through nozzles up to 500 microns in diameter the flow rate per nozzle can range from 0.2 to 3 kg/hr, which equates to a mass flux of about 1 to about 15 kg/($mm^2$×hr).

The distance between nozzle 704 and the top of the liquid in coagulation vessel 706 is selected to allow droplets to become spherical before reaching the top of the liquid. The distance can be from 1 to 20 cm, but is more typically in the range of 1 to 5 cm so as to reduce distortion of the droplet shape upon impact with the liquid surface, thereby eliminating the need for a reaction gas, foam layer, or tangentially directed reaction liquid prior to the droplets entering the coagulation vessel 706. The reactant chemical in the droplets of slurry reacts with the coagulation liquid in the coagulation vessel 706 and a semi-solid surface is formed on the droplets, which helps retain the spherical shape and prevents agglomeration of the pellets. Preferably, the residence time of pellets in coagulation vessel 706 is sufficient to allow pellets to become rigid enough to prevent deformation of the spherical shape when they are removed and dried, i.e., semi-rigid. In some embodiments, pellets may fall into a coagulation liquid solution flowing vertically upward so that settling of the particle through the liquid will be retarded to produce a longer residence time in the coagulation vessel 706.

Green pellets formed using the drip cast system of FIG. 2 can be washed to remove excess coagulation agent and conveyed to other devices such as the pre-sintering device 165 and/or the sintering device 170.

The ceramic particle can have any suitable composition. In one or more exemplary embodiments, the ceramic particle can be or include silica and/or alumina in any suitable amounts. According to several exemplary embodiments, the ceramic particle includes less than 80 wt %, less than 60 wt %, less than 40 wt %, less than 30 wt %, less than 20 wt %, less than 10 wt %, or less than 5 wt % silica based on the total weight of the ceramic particle. According to several exemplary embodiments, the ceramic particle includes from about 0.1 wt % to about 70 wt % silica, from about 1 wt % to about 60 wt % silica, from about 2.5 wt % to about 50 wt % silica, from about 5 wt % to about 40 wt % silica, or from about 10 wt % to about 30 wt % silica. According to several exemplary embodiments, the ceramic particle includes at least about 30 wt %, at least about 50 wt %, at least about 60 wt %, at least about 70 wt %, at least about 80 wt %, at least about 90 wt %, or at least about 95 wt % alumina based on the total weight of the ceramic particle. According to several exemplary embodiments, the ceramic particle includes from about 30 wt % to about 99 wt % alumina, from about 40 wt % to about 95 wt % alumina, from about 50 wt % to about 90 wt % alumina, from about 60 wt % to about 95 wt % alumina, or from about 70 wt % to about 90 wt % alumina.

According to several exemplary embodiments, the ceramic compositions disclosed herein include ceramic particles that are substantially round and spherical having a size in a range between about 6 and 270 U.S. Mesh. For example, the size of the ceramic particle can be expressed as a grain fineness number (GFN) in a range of from about 15 to about 300, or from about 30 to about 110, or from about 40 to about 70. According to such examples, a sample of ceramic particles can be screened for separation by size, for example, intermediate sizes between 20, 30, 40, 50, 70, 100, 140, 200, and 270 U.S. mesh sizes to determine GFN. The correlation between sieve size and GFN can be determined according to Procedure 106-87-S of the American Foundry Society Mold and Core Test Handbook, which is known to those of ordinary skill in the art.

The ceramic particles can have any suitable size. For example, the ceramic particle can have a mesh size of at least about 6 mesh, at least about 10 mesh, at least about 16 mesh, at least about 20 mesh, at least about 25 mesh, at least about 30 mesh, at least about 35 mesh, or at least about 40 mesh. According to several exemplary embodiments, the ceramic particle has a mesh size from about 6 mesh, about 10 mesh, about 16 mesh, or about 20 mesh to about 25 mesh, about 30 mesh, about 35 mesh, about 40 mesh, about 45 mesh, about 50 mesh, about 70 mesh, about 100 mesh, about 140 mesh, about 170 mesh, or about 200 mesh. According to several exemplary embodiments, the ceramic particle has a mesh size from about 4 mesh to about 120 mesh, from about 8 mesh to about 170 mesh, from about 10 mesh to about 60 mesh, from about 16 mesh to about 20 mesh, from about 20 mesh to about 40 mesh, or from about 25 mesh to about 35 mesh.

The ceramic particles disclosed herein can have any suitable shape. The ceramic particles can be substantially round, cylindrical, square, rectangular, elliptical, oval, egg-shaped, or pill-shaped. In one or more exemplary embodiments, the ceramic particles are substantially round and spherical. The ceramic particles can have an average sphericity value of about 0.5 or greater, about 0.7 or greater, about 0.8 or greater, or about 0.9 or greater compared to a Krumbein and Sloss chart. The ceramic particles can have an average roundness value of about 0.5 or greater, about 0.7 or greater, about 0.8 or greater, or about 0.9 or greater compared to a Krumbein and Sloss chart.

The ceramic particles can have any suitable density. The ceramic particles can have a density of at least about 1.5 g/cc, at least about 1.7 g/cc, at least about 1.9 g/cc, at least about 2.1 g/cc, at least about 2.3 g/cc, at least about 2.5 g/cc, at least about 2.7 g/cc, at least about 3 g/cc, at least about 3.3 g/cc, or at least about 3.5 g/cc. In one or more exemplary embodiments, the ceramic particles can have a density of less than 4 g/cc, less than 3.5 g/cc, less than 3 g/cc, less than 2.75 g/cc, less than 2.5 g/cc, or less than 2.25 g/cc. For example, the ceramic particles can have a density of about 1.6 g/cc to about 3.5 g/cc, about 1.8 g/cc to about 3.2 g/cc, about 2.0 g/cc to about 2.7 g/cc, about 2.1 g/cc to about 2.4 g/cc, or about 2.2 g/cc to about 2.6 g/cc.

The ceramic particles can have any suitable bulk density or packing density. In one or more exemplary embodiments, the ceramic particles have a bulk density of less than 3 g/cc, less than 2.5 g/cc, less than 2.2 g/cc, less than 2 g/cc, less than 1.8 g/cc, less than 1.6 g/cc, or less than 1.5 g/cc. The ceramic particles can have a bulk density of about 1 g/cc, about 1.15 g/cc, about 1.25 g/cc, about 1.35 g/cc, or about 1.45 g/cc to about 1.5 g/cc, about 1.6 g/cc, about 1.75 g/cc, about 1.9 g/cc, or about 2.1 g/cc or more. For example, the ceramic particles can have a bulk density of about 1.3 g/cc to about 1.8 g/cc, about 1.35 g/cc to about 1.65 g/cc, or about 1.5 g/cc to about 1.9 g/cc.

The ceramic particles can have any suitable surface roughness measured in accordance with the method disclosed in U.S. Pat. Nos. 8,865,631, 8,883,693, and 9,175,210. The ceramic particles can have a surface roughness of less than 5 μm, less than 4 μm, less than 3 μm, less than 2.5 μm, less than 2 μm, less than 1.5 μm, or less than 1 μm. For example, the ceramic particles can have a surface roughness of about 0.1 μm to about 4.5 μm, about 0.4 μm to about 3.5 μm, or about 0.8 μm to about 2.8 μm.

Impinging a plurality of the ceramic particle under a gas-entrained velocity onto a flat mild steel target can result in an erosivity of the target material. Impinging the gas-entrained ceramic particles at a velocity of about 160 meters per second (m/s) onto the flat mild steel target can result in an erosivity of about 0.01 milligrams lost from the flat mild steel target per kilogram of proppant contacting the target (mg/kg), about 0.05 mg/kg, about 0.1 mg/kg, about 0.5 mg/kg, about 1 mg/kg, or about 2 mg/kg to about 5 mg/kg, about 7 mg/kg, about 10 mg/kg, about 12 mg/kg, or about 15 mg/kg. Impinging the gas-entrained ceramic particles at a velocity of about 200 m/s onto the flat mild steel target can result in an erosivity of about 0.01 mg/kg, about 0.05 mg/kg, about 0.1 mg/kg, about 0.5 mg/kg, about 1 mg/kg, or about 2 mg/kg to about 5 mg/kg, about 7 mg/kg, about 10 mg/kg, about 12 mg/kg, or about 15 mg/kg. Impinging the gas-entrained ceramic particles at a velocity of about 260 m/s onto the flat mild steel target can result in an erosivity of about 1 mg/kg, about 5 mg/kg, about 10 mg/kg, about 20 mg/kg, about 40 mg/kg, or about 60 mg/kg to about 65 mg/kg, about 70 mg/kg, about 80 mg/kg, about 90 mg/kg, or about 100 mg/kg.

The ceramic particles can have any suitable porosity. The ceramic particles can have an internal interconnected porosity from about 1%, about 2%, about 4%, about 6%, about 8%, about 10%, about 12%, or about 14% to about 18%, about 20%, about 22%, about 24%, about 26%, about 28%, about 30%, about 34%, about 38%, about 45%, about 55%, about 65%, or about 75% or more. In several exemplary embodiments, the internal interconnected porosity of the ceramic particles is from about 5% to about 75%, about 5% to about 15%, about 10% to about 30%, about 15% to about 35%, about 25% to about 45%, about 30% to about 55%, or about 35% to about 70%.

The sintered ceramic particles, which can be produced by any suitable method of manufacture, including but not limited to the methods disclosed in U.S. Pat. Nos. 4,068,718, 4,427,068, 4,440,866, 5,188,175, 7,036,591, the entire disclosures of which are incorporated herein by reference, as well as the methods disclosed in accordance with FIGS. 1 and 2, can be crushed, ground, pulverized, milled or otherwise broken up to form the micromesh proppant of the present disclosure.

In one or more exemplary embodiments, the sintering of the ceramic particles can be followed by the step of breaking the sintered pellets and sizing the resulting particles to a particle size of about 150 mesh or greater. For example, after the sintering and pelletizing steps, the spherical pellets produced can then be fragmented in suitable grinding devices to produce and size proppant particles of greater than 150 mesh. These devices include mills which can be of several different types, such as rod mills and high speed rotor mills. Grinding can be performed at any suitable pressure. In at least one embodiment, grinding is performed at a pressure of about 10,000 psi or greater, such as about 20,000 psi or greater.

In at least one embodiment, a proppant particle of the present disclosure has one or more of: (1) a mean particle size of from about 150 mesh to about 250 mesh, such as about 200 mesh, (2) a bulk density of from about 1.4 g/cm$^3$ to about 2 g/cm$^3$, such as from about 1.6 g/cm$^3$ to about 1.8 g/cm$^3$, (3) an apparent specific gravity of from about 2 g/cm$^3$ to about 4 g/cm$^3$, such as from about 2.7 g/cm$^3$ to about 3.2 g/cm$^3$, and (4) an apparent volume of from about 0.03 gallons/lb to about 0.05 gallons/lb, such as from about 0.04 gallons/lb to about 0.044 gallons/lb.

The term “bulk density”, as used herein, refers to the weight per unit volume, including in the volume considered, the void spaces between the particles.

The term “apparent specific gravity,” as used herein, is the weight per unit volume (grams per cubic centimeter) of the particles, including the internal porosity. The apparent specific gravity values given herein can be determined by the Archimedes method of liquid (water) displacement according to API RP60.

In one or more exemplary embodiments, a proppant particle has a mechanical strength greater than the mechanical strength of sand proppant. For example, while specially screened (usually 20-40 mesh) high grade sand (e.g., Ottawa sand) can be used with higher closure stress formations, performance drops off drastically as stress increases, particularly above 8,000 psi. At stresses of 10,000 psi and above, even the highest grade sand is inadequate. A proppant particle of the present disclosure can have a crush strength at 7,500 psi of from about 1%, about 1.5%, about 2%, or about 2.5% to about 20%, about 15%, about 10%, about 5%, or about 4.5%, as determined using API Recommended Practices RP60, Second Edition, December 1995, for testing proppants. Without being bound by theory, it is believed that because the smallest proppant particles formed in a process of the present disclosure are about 4-times smaller than the smallest particles in 100 mesh frac sand, proppant particles of the present disclosure can provide much of the benefits of 100 mesh sand proppant, but can also prop open even the narrowest secondary fractures and microfractures providing improved hydrocarbon yield from the fracture. In addition, the average settling rate of a proppant particle of the present disclosure can be over twice as slow as compared to 100 mesh sand proppant. In addition, proppant particles of the present disclosure exceed the conductivity, strength, and durability of sand which maximizes the production rates and recovery from the increased reservoir contact.

In one or more embodiments, the micromesh proppant can be used for grinding or polishing the orifices of metallic tubulars, such as casings, used in oil and gas wells. For example, a metallic casing can have several orifices, or perforations, along its length, by means of which the propagation of the fracture begins and through which the oil and gas flow. These orifices, which can be created by a perforating gun, can contain protrusions or abrasive portions (for example resulting from a perforation gun) that can create drag or friction thereby reducing the rate at which fluid flows through said orifices. By pumping micromesh proppant along with fluids, at extremely high speeds, said orifices can be ground by means of the micromesh proppant acting as an abrasive to said orifices when it passes through them. The fact that duly ground orifices are obtained enables the subsequent fracturing operation to be carried out at lower pressures. Such ground orifices may also permit greater production flowrates and ultimately greater estimated ultimate recovery (EUR) due to reduced friction of the production flowpath(s).

The use of the abrasive surfaces of the micromesh proppant of the present disclosure has shown excellent results as a substitute for the use of the products conventionally used for this purpose. Moreover, the mechanical strength of the proppant of the present disclosure is superior to that of natural sand. For example, even when said proppant breaks as a result of the action of these forces, the resulting particles will be bigger (coarser) than the natural sand particles and will not be fractured, pulverized and reduced to very fine particles, like dust, as happens with natural sand, which are formed mainly by quartz. Therefore, as a result of the use of the angular abrasive proppant of the present invention, fine particles are not generated, and consequently a higher microfracture conductivity is ensured.

It is understood that modifications to the invention may be made as might occur to one skilled in the field of the invention within the scope of the appended claims. All embodiments contemplated hereunder which achieve the objects of the invention have not been shown in complete detail. Other embodiments may be developed without departing from the spirit of the invention or from the scope of the appended claims. Although the present invention has been described with respect to specific details, it is not intended that such details should be regarded as limitations on the scope of the invention, except to the extent that they are included in the accompanying claims.

What is claimed is:

1. A proppant particle comprising a sintered ceramic material having:
- an angular abrasive shape having a plurality of protrusions,
- a mean particle size of about 150 mesh to about 500 mesh,
- a crush strength at 7,500 psi of about 1% to about 20%, and
- an average sphericity value of about 0.5 or greater but less than 1.

2. The proppant particle of claim 1, wherein the mean particle size is about 175 mesh to about 300 mesh.

3. The proppant particle of claim 2, wherein the crush strength is about 5% to about 15%.

4. The proppant particle of claim 3, wherein the proppant particle has a bulk density of about 1.4 $g/cm^3$ to about 2 $g/cm^3$ and an apparent specific gravity of about 2 $g/cm^3$ to about 4 $g/cm^3$.

5. The proppant particle of claim 4, wherein the proppant particle has a bulk density of about 1.6 $g/cm^3$ to about 1.8 $g/cm^3$ and an apparent specific gravity of about 2.7 $g/cm^3$ to about 3.2 $g/cm^3$.

6. The proppant particle of claim 1, wherein the sintered ceramic material comprises sintered alumina.

7. The proppant particle of claim 1, wherein the sintered ceramic material comprises sintered kaolin.

8. The proppant particle of claim 1, wherein the sintered ceramic material comprises sintered bauxite.

9. The proppant particle of claim 1, wherein the average sphericity value is about 0.5 or greater but less than 0.7.

10. The proppant particle of claim 1, wherein the average sphericity value is about 0.7 or greater but less than 1.

11. The proppant particle of claim 10, wherein the average sphericity value is about 0.9 or greater but less than 1.

12. A process for forming proppant particles, comprising:

introducing a ceramic raw material comprising alumina to a mixer;

stirring the ceramic raw material to form a dry homogenous particulate mixture having an average particle size of about 15 microns or less;

introducing water to the mixer to contract the dry homogenous particulate mixture;

stirring the dry homogenous particulate mixture with the water to cause formation of green pellets;

removing the green pellets from the mixer;

drying the green pellets from the mixer to provide dried pellets;

sintering the dried pellets to form sintered pellets; and breaking the sintered pellets to form proppant particles comprising a sintered ceramic material, wherein the sintered ceramic material comprises an angular abrasive shape having a plurality of protrusions, wherein the proppant particles comprise an angular shape, a mean particle size of about 150 mesh to about 700 mesh, and an average sphericity value of about 0.5 or greater but less than 1.

13. The process of claim 12, wherein sintering comprises sintering the dried pellets at a temperature of about 1400° C. to about 1650° C.

14. The process of claim 12, wherein breaking is selected from crushing, grinding, pulverizing, or milling.

15. The process of claim 14, wherein breaking comprises grinding at a pressure of 10,000 psi or greater.

16. The process of claim 15, wherein breaking comprises grinding at a pressure of 20,000 psi or greater.

17. The process of claim 12, wherein the proppant particles have a bulk density of about 1.4 $g/cm^3$ to about 2 $g/cm^3$ and an apparent specific gravity of about 2 $g/cm^3$ to about 4 $g/cm^3$.

18. The process of claim 17, wherein the proppant particles have a mean particle size of about 175 mesh to about 500 mesh.

19. The process of claim 17, wherein the average sphericity value is about 0.5 or greater but less than 0.7.

20. The process of claim 12, wherein the average sphericity value is about 0.7 or greater but less than 1.

* * * * *